US008271367B1

(12) United States Patent
Classen

(10) Patent No.: US 8,271,367 B1
(45) Date of Patent: Sep. 18, 2012

(54) SYSTEMS AND METHODS FOR FINANCIAL STRESS TESTING

(75) Inventor: Todd M. Classen, Omaha, NE (US)

(73) Assignee: WebEquity Solutions, LLC, Omaha, NE (US)

( * ) Notice: Subject to any disclaimer, the term of this patent is extended or adjusted under 35 U.S.C. 154(b) by 12 days.

(21) Appl. No.: 13/105,445

(22) Filed: May 11, 2011

(51) Int. Cl.
*G06Q 40/00* (2012.01)
(52) U.S. Cl. .......................... 705/35; 705/36 R; 705/37
(58) Field of Classification Search .................. 705/35, 705/36 R, 37
See application file for complete search history.

(56) References Cited

U.S. PATENT DOCUMENTS

| | | | |
|---|---|---|---|
| 6,078,903 A | 6/2000 | Kealhofer | |
| 7,277,869 B2 | 10/2007 | Starkman | |
| 7,526,446 B2 | 4/2009 | Aguais et al. | |
| 7,546,270 B1 | 6/2009 | Zhao | |
| 7,657,475 B1 | 2/2010 | Arpin et al. | |
| 7,689,494 B2 | 3/2010 | Torre et al. | |
| 7,693,782 B1 * | 4/2010 | Stricker et al. | 705/38 |
| 7,729,983 B1 * | 6/2010 | Ellis | 705/38 |
| 7,734,523 B1 | 6/2010 | Cui et al. | |
| 7,739,171 B2 | 6/2010 | Tilton | |
| 7,756,896 B1 | 7/2010 | Feingold | |
| 7,778,897 B1 | 8/2010 | Rachev et al. | |
| 7,783,551 B1 | 8/2010 | Browne et al. | |
| 8,015,091 B1 * | 9/2011 | Ellis | 705/36 T |
| 2003/0033229 A1 | 2/2003 | Keyes et al. | |
| 2005/0027645 A1 | 2/2005 | Lui et al. | |
| 2005/0262013 A1 | 11/2005 | Guthner et al. | |
| 2009/0024539 A1 | 1/2009 | Decker | |
| 2009/0248588 A1 | 10/2009 | Hadi et al. | |
| 2009/0299911 A1 * | 12/2009 | Abrahams et al. | 705/36 R |
| 2010/0114757 A1 | 5/2010 | Jeng et al. | |
| 2010/0205108 A1 * | 8/2010 | Mun | 705/36 R |
| 2010/0211494 A1 * | 8/2010 | Clements | 705/37 |
| 2011/0078073 A1 * | 3/2011 | Annappindi | 705/38 |
| 2011/0173137 A1 * | 7/2011 | Browne et al. | 705/36 R |
| 2011/0184884 A1 * | 7/2011 | Lyons et al. | 705/36 R |
| 2011/0213731 A1 * | 9/2011 | Cho et al. | 705/36 R |

(Continued)

FOREIGN PATENT DOCUMENTS

WO WO2010000487 A1 1/2010

OTHER PUBLICATIONS

Crossman, Penny, Risk Dashboard Lets Bankers Stress-Test Loan Portfolios, Bank Systems & Technology, Mar. 17, 2010, http://www.banktech.com/risk-management/223800257, printed Feb. 5, 2011, 2 pages.

(Continued)

*Primary Examiner* — Jagdish Patel
*Assistant Examiner* — Sara C Hamilton
(74) *Attorney, Agent, or Firm* — Fredrikson & Byron, PA

(57) ABSTRACT

Embodiments provide computerized stress testing for evaluating the effect of changes in the financial position of one or more borrowers. A stressed financial parameter (e.g., a risk rating or financial ratio) is generated for a borrower based on a selection of a borrower account type, a stress amount for applying to the account type, and additional financial inputs corresponding to the borrower. In some cases the stressed financial parameter is generated as a function of an unstressed financial parameter for the borrower, the stress amount, a numerator factor corresponding to the selected account type, and a denominator factor corresponding to the selected account type. Systems, methods, and computer-readable media are provided with the stress testing functionality.

23 Claims, 12 Drawing Sheets

U.S. PATENT DOCUMENTS

2011/0270779 A1* 11/2011 Showalter .................. 705/36 R
2011/0320340 A1* 12/2011 Falconer et al. ............... 705/38

OTHER PUBLICATIONS

WebEquity Solutions Press Release, WebEquity Delivers Lending Industry's First Risk Management Dashboard for Stress Testing Complex Credits, Mar. 17, 2010, http://www.webequitysolutions.com/news-resources/press-releases/RMDB-031710.asp, printed Feb. 5, 2011, 2 pages.

WebEquity Solutions, Loan Portfolio Stress Testing and Risk Management—Are You Ready?, Apr. 27, 2009 Webinar Series, 54 pages.

CASHCRE Financial Tools, Anticipate Change, http://www.financialtools.com/cre.html, printed Sep. 7, 2010, 2 pages.

AIM & AIM Financial Tools, Tracker the Predecessors to Cash OnTrack & Opportunity, http://www.financialtools.com/aim.html, printed Sep. 7, 2010, 1 page.

WebEquity Solutions, Loan Portfolio Stress Testing—A Proactive Approach for Lenders, Apr. 8, 2010 Webinar Series, 27 pages.

Oracle Press Release, Oracle Announces New Financial Services Solution for Enterprise-Wide Stress Testing, Oracle OpenWorld, San Francisco, CA, Oct. 13, 2009, http://www.oracle.com/us/corporate/press/036667, printed May 11, 2011, 2 pages.

* cited by examiner

SYSTEMS AND METHODS FOR FINANCIAL STRESS TESTING

FIELD

This disclosure generally relates to computerized financial analysis methods and systems, and more specifically relates to evaluating the effects of potential changes in a borrower's financial position.

BACKGROUND

A fundamental aspect of the lending process is the ability of lenders to quantify and evaluate the financial strengths and/or weaknesses of potential and current borrowers. Such assessments underlie not only initial decisions about loan applications, but also ongoing evaluations of a borrower's repayment capacity after the initial loan decision. Understanding changes in the financial position of individual borrowers can help lenders address potential problems for individual borrowers, as well as help lenders understand the aggregate risk characteristics associated with entire loan portfolios.

Since the advent of the 2007-2008 financial crisis, government regulators have intensified their scrutiny of lenders' credit risk management practices. In particular, regulators have been increasingly requiring lenders to quantify risks and assess the impact of changing market conditions on the risks in their loan portfolios, ultimately with the goal of determining potential effects on the lender's financial standing, including the lender's capital, loan and lease loss reserves, and earnings. As just one example, bank examiners are often asking lenders to more actively manage their loan portfolios, including stress testing loans to determine the sensitivity of portfolio segments with common risk characteristics to potential market conditions.

The financial crisis has also led to decreases in the overall number of loans over the last four years for most complex credit areas. In addition, between 2007 and 2010, net charge offs to loans more than quadrupled, the number of non-current loans increased to about 5%, return on assets decreased, and the number of FDIC Problem Institutions skyrocketed to about 12% of FDIC insured banks. The current lending environment makes it more important than ever for lenders to actively and accurately manage their existing loan portfolios. Active portfolio management can provide insight enabling a lender to maximize returns on smaller portfolios, more accurately predict troublesome loans, and take proactive steps to mitigate those risks.

Unfortunately, understanding the risks inherent in each loan or in a group of loans in a lender's portfolio can be a challenging undertaking Loan portfolios may include many types of loans to many different kinds of borrowers. For example, a single loan portfolio may include multiple loans for commercial real estate, construction, commercial industrial, small business, agriculture, and consumer purposes. Each borrower's financial position can vary based on a multitude of different factors and each type of loan may be subjected to different types and/or degrees of changing market conditions. In addition, it can be important to understand and be able to comprehensively evaluate loans across multiple cross-sections of a portfolio, including for example, for the entire portfolio, a portfolio segment, individual loans, and loans by branch, loan officer, customer, business type, credit relationships, risk rating, and/or scoring date.

SUMMARY

Embodiments of the invention address these and other needs related to loan analysis and stress testing. According to one aspect of the invention, a computerized method for borrower stress testing is provided. The method includes receiving a selection of a selected account type and a stress amount for applying to the selected account type. The method also includes receiving an input with one or more processors from a database in a computer-readable memory device. The database includes information related to a plurality of account types of a borrower. The method also includes generating a stressed financial ratio for the borrower with the one or more processors. The stressed financial ratio is generated as a function of an unstressed financial ratio for the borrower, the stress amount, a numerator factor corresponding to the selected account type, and a denominator factor corresponding to the selected account type. The unstressed financial ratio is a function of a financial ratio numerator and a financial ratio denominator. The numerator factor is a function of the financial ratio numerator and a numerator account value for the selected account type. The denominator factor is a function of the financial ratio denominator and a denominator account value for the selected account type.

According to another aspect of the invention, a computer-readable memory device (e.g., RAM, ROM, disks, drives, CDs, DVDs, tapes, etc.) comprises executable instructions for causing one or more processors to carry out a method of generating a stressed financial ratio for a borrower. The instructions cause the one or more processors to receive or accept a selection of a selected account type and a stress amount for applying to the selected account type. The processor(s) are also instructed to receive an input from a database comprising information related to a plurality of account types of a borrower. The instructions also cause the one or more processors to generate a stressed financial ratio for the borrower as a function of an unstressed financial ratio for the borrower, the stress amount, a numerator factor corresponding to the selected account type, and a denominator factor corresponding to the selected account type. The unstressed financial ratio is a function of a financial ratio numerator and a financial ratio denominator. The numerator factor is a function of the financial ratio numerator and a numerator account value for the selected account type. The denominator factor is a function of the financial ratio denominator and a denominator account value for the selected account type.

According to another aspect of the invention, a system for borrower stress testing includes one or more processors adapted for carrying out computer-executable instructions and one or more computer-readable memory devices coupled to the one or more processors. The computer-readable memory device(s) include executable instructions for causing the one or more processors to receive or accept certain inputs, including a selection of a selected account type, a stress amount for applying to the selected account type, and an input from a database, such as an unstressed financial ratio for the borrower, a numerator factor corresponding to the selected account type, and/or a denominator factor corresponding to the selected account type. The instructions also cause the processor(s) to generate a corresponding stressed financial ratio for the borrower as a function of the unstressed financial ratio for the borrower, the stress amount, the numerator factor, and the denominator factor.

Embodiments of the present invention can optionally provide one or more of the following features and/or advantages. Some embodiments provide for stress testing multiple factors that describe the financial position of a borrower. In some cases multiple factors may be individually or simultaneously stressed. Factors that may be stressed in certain embodiments include accounts listed on borrower financial documents, including balance sheets, income and expense statements, and/or loan collateral documents. The stress testing can produce a number of useful outputs. In certain embodiments, stress testing one or more borrower accounts can generate a stressed financial ratio describing certain characteristics of a borrower's financial position. Some embodiments provide the ability to generate multiple, different stressed financial ratios for the same borrower. An exemplary method and/or system may also or alternatively generate a stressed risk rating for a borrower based on one or more stressed factors. In some cases the stressed risk rating incorporates a lender's specific risk rating methodology, which may vary based on the selection of borrower and/or portion of the lender's loan portfolio. Accordingly, certain embodiments can provide the capability to generate stressed risk ratings for multiple borrowers at the same time, and then compare those stressed risk ratings with original, unstressed risk ratings for the multiple borrowers. According to some embodiments of the invention, an exemplary system and/or method may provide simultaneous stress testing of an entire portfolio of loans (and corresponding borrowers) and/or may provide simultaneous stress testing of borrowers within one or more selected segments of the loan portfolio.

Some embodiments of the invention may also include the generation of stressed outputs (e.g., financial ratios and/or risk ratings) using one or more novel methodologies. As just one example, certain embodiments of the invention provide simplified and fast methods for generating stressed financial measures. For example, certain embodiments generate one or more stressed financial ratios without necessarily performing a fundamental, complete recalculation of the financial ratio (s). Some embodiments provide a simplified, uniform stress testing model that can be used to generate a variety of different stressed financial ratios. In some cases, either a first stress relationship or a second stress relationship may be used to generate up to seventeen or more stressed financial ratios and other stressed outputs. According to some embodiments, a stress testing model can be generated using existing account information for one or more borrower customers of a lender. In some cases a system/method may be preconfigured with borrower account information, including several unstressed financial parameters, which allow generation of one or more stressed outputs additionally based on a user selected borrower account and a stress amount.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of hardware, forms, structures, processes, and models, are provided for selected elements, and all other elements employ that which is known to those of ordinary skill in the field of the invention. Those skilled in the art will recognize that many of the noted examples, or aspects therein, have a variety of suitable alternatives.

As will be appreciated from a reading of this disclosure, several embodiments of the present invention are described herein as they relate to evaluating the effects of potential changes in a borrower's financial position. In particular, systems and methods are described for generating stressed financial parameters such as stressed financial ratios and/or stressed risk ratings for one or more borrowers of a lender. Such examples are not intended to limit the scope of the present invention to any particular implementation and it should be appreciated that aspects of the invention may be applied in multiple combinations and/or in a variety of settings. In one sense, embodiments of the invention are generally useful in and relate to the field of computerized financial analysis.

Figure 1:
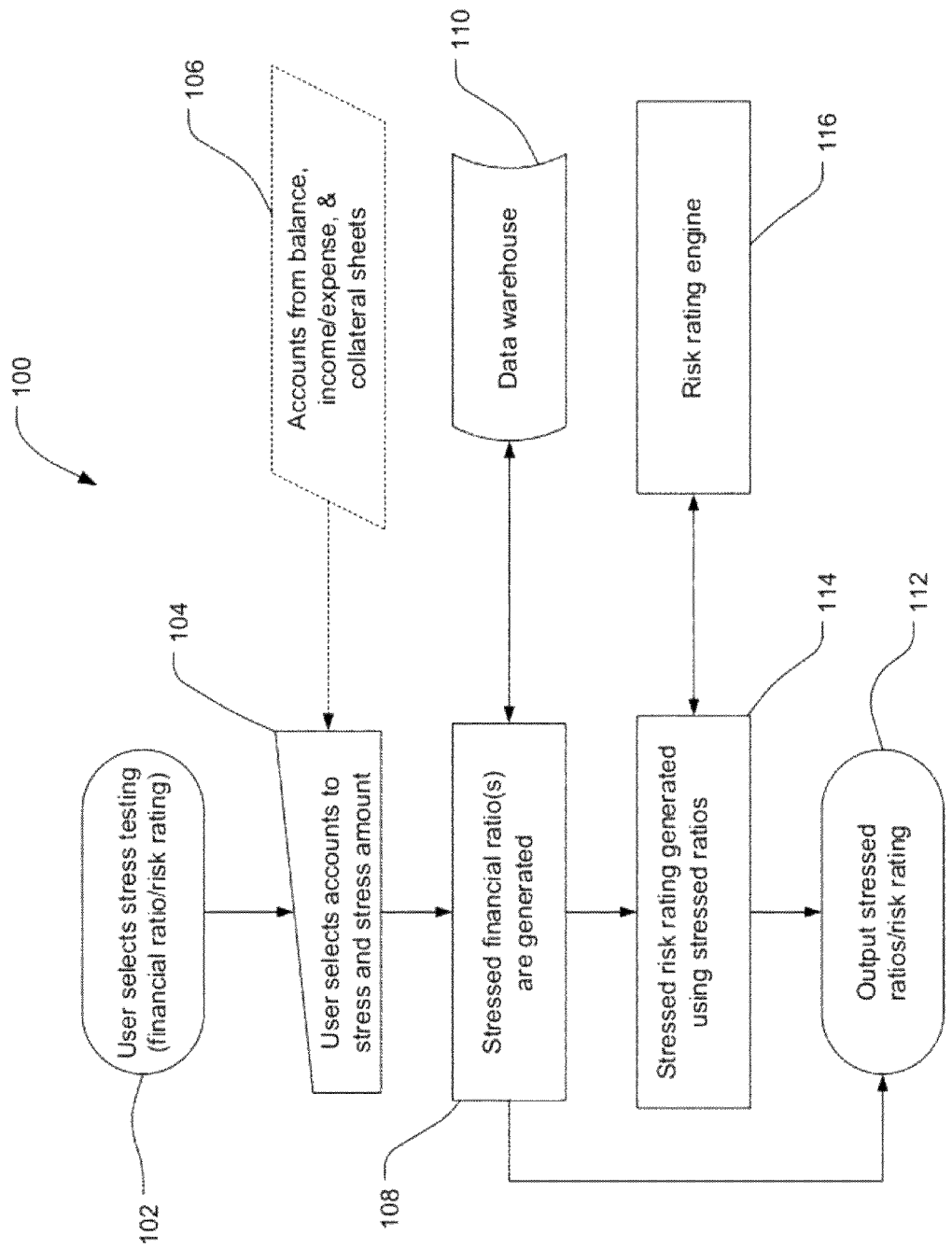
FIG. 1 is a conceptual flow diagram illustrating interactions and steps within a system for stress testing according to an embodiment of the invention.

FIG. 1 is a conceptual flow diagram 100 illustrating interactions within a system for performing a method of financial stress testing according to an embodiment of the invention. The financial stress testing is a form of testing that can be used to determine the financial stability of one or more borrowers in response to changes in the borrowers' financial positions. In this example, the stress testing begins with the selection 102 of a type of stress testing. A number of types of stress testing may be provided depending upon the needs for a particular implementation of the invention. In the illustrated example, a user can select 102 between stress testing of a financial ratio and/or a risk rating for one or more borrowers. In some embodiments only one type of stress testing may be available making this step unnecessary, and/or this selection may already be made for a particular user.

The terms "stress test" and "stress" may be used herein in a number of contexts, and unless otherwise stated, the terms loosely refer to a process of simulating a change in the underlying financial position of a borrower. Thus, while portions of the disclosure may refer to stress testing a number of different things (e.g., a ratio, a risk rating, a borrower or customer, certain borrower accounts, a loan, a portfolio, or segment of a portfolio), these references may often be interpreted as referring to the scope of the testing and/or the form of the stressed output. As just one example of many, in certain cases a general reference to stress testing a lender's loan portfolio more particularly refers to a process of determining the effect of simulated changes in the financial standing of the borrowers of loans within that portfolio.

Returning to FIG. 1, after selecting/determining the type of stress testing to perform, a user can select 104 one or more "accounts" to stress and the stress amount by which the accounts should be stressed. The term "account" is used herein to generally refer to a particular amount or account total that is used to calculate the type of financial parameter (e.g., ratio or rating) being stressed. Thus, a borrower account factors into the overall calculation of, e.g., a financial ratio or risk rating. Some examples of accounts include those listed on borrower financial statements provided to the lender when applying for a loan. For example, an account to be stressed may be selected from a group 106 of borrower balance sheets, income and/or expense reports, and/or loan collateral documents. Just a few examples of these types of accounts include different revenues, expenses, sales, profits, assets, and liabilities. Of course a wide variety of account types may be used depending upon the borrower information available and the type of financial parameter being stressed. The stress amount may take a variety of forms, including for example, an absolute dollar amount or a percentage by which to increase or decrease the account.

Upon receiving or otherwise determining the type of stress testing to perform, the account(s) to stress, and the stress amount, one or more stressed financial ratios are generated 108. The generation 108 of a stressed financial ratio (or other parameter) can be carried out in a number of ways. In many cases a stress testing system may reference and/or receive one or more inputs from an existing data warehouse 110 storing financial information related to one or more borrowers. For example, data warehouse 110 may provide inputs such as an unstressed financial parameter and on or more other inputs used to generate a stressed financial parameter. As will be discussed further herein, in some cases the stressed financial parameter is generated based on an unstressed financial parameter and one or more other inputs without the need to completely recalculate the financial parameter from all of its fundamental factors.

In certain embodiments one or more stressed financial ratios (or other parameters) can be output 112 immediately after generation. In some embodiments, one or more financial ratios may also or alternatively be used to generate 114 a stressed risk rating for one or more borrowers. For example, a stress testing system may send one or more stressed financial ratios to a risk rating engine 116 to generate a stressed risk rating for one or more borrowers. The stressed risk rating can then be output 112 with or instead of one or more stressed financial ratios.

Figure 2:
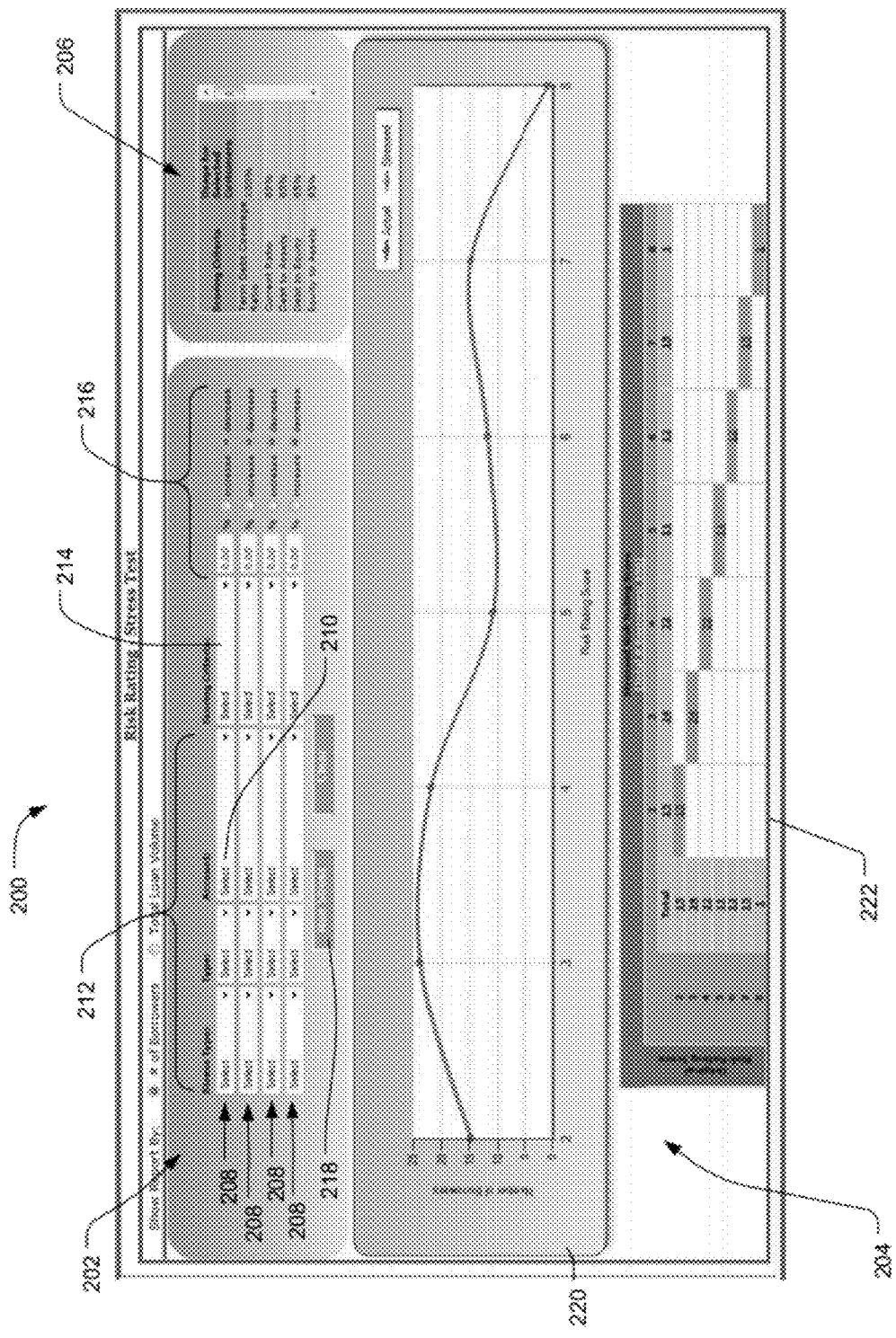
FIG. 2 is an illustration of a user interface for generating a stressed risk rating according to an embodiment of the invention.

FIG. 2 is an illustration of a user interface 200 for generating a stressed financial parameter according to an embodiment of the invention, in this case a stressed risk rating. Of course, the user interface 200 is just one example of an interface that can be provided in any suitable manner. As will be discussed further herein, according to some embodiments the user interface 200 is a graphical user interface (GUI) that is programmed to be the front end or interactive portion of a stress testing engine programmed in software instructions for execution with a computer.

The user interface 200 in this example generally includes an input section 202, an output section 204, and an informational section 206. The input section 202 is configured to allow a system user to define at least some parameters for performing a stress test. In this case the input section 202 allows entry of up to four unique, simultaneous stresses 208 on different accounts of a borrower. Of course this is just one example and certain embodiments may allow for a fewer number or a greater number of simultaneous stresses 208. In this case a user selects the particular account 210 to stress using a series of drop down menus 212 (here labeled "Stress Type", "Type", and "Account") that increasingly refine and zero in on the account selection. Of course different methodologies can be used for selecting a particular account. After selecting the particular account 210 to stress, a user can select a scoring criteria 214. The scoring criteria 214 corresponds to the desired financial parameter (e.g., financial ratio or risk rating) chosen for stress testing. The informational section 206 provides an indication of the different scoring criteria used through the group of selected borrowers. Clicking the "Run Stress" button 218 signals the system to generate one or more stressed financial parameters (in this case a risk rating) for a borrower and display a corresponding output in the output section 204. In this example, the output section 204 includes a graph 220 and a migration table 222 that each display changes in the risk rating for a group of borrowers. Although not shown in FIG. 2, upon generating the stressed risk rating, both the original and stressed risk ratings may be graphed in the stress graph 220 and migration table 222, showing the effects of the selected stresses upon the risk ratings of several borrowers.

The user interface 200 may allow for stress testing to be performed for any desirable number of borrowers. Although not shown, it is contemplated that additional interfaces can be provided which allow a user to select a wide variety of groupings of loans and/or borrowers prior to stress testing. For example, a user may select a particular segment of a loan portfolio using one or more types of selection criteria as a precursor to the stress testing. Upon selecting a particular group of borrowers, the stress testing system can reference and/or receive one or more inputs from an existing database storing financial information (e.g., an unstressed financial parameter and other financial information) related to group of borrowers. A stressed financial parameter (e.g., financial ratio, risk rating), can then be generated for each borrower within the selected group of borrowers.

Selection of a particular segment of borrowers can occur in any suitable manner and provide any desired degree of granularity. As just a few examples, a user may be able to define a segment of a loan portfolio based on one or more of geography, industry, length of client relationship, account valuation, and the like. Other possible segmentation criteria include loans by branch, loan officer, business type, credit relationships, risk rating, and/or scoring date. In addition, a user may simply select to stress the accounts of a single borrower or a specific set of borrowers by name. Referring to the migration table 222 in FIG. 2, it can be seen that stress test results may be generated for a group of 100 borrowers. Of course, this is just one example and embodiments may allow for stress testing even larger numbers of borrowers (e.g., 500, 1000, 10000, 100000, etc.) or smaller numbers of borrowers (e.g., 75, 50, 25, 10, etc.) and then simultaneously displaying the stress test results for all the stressed borrowers.

Figure 3:
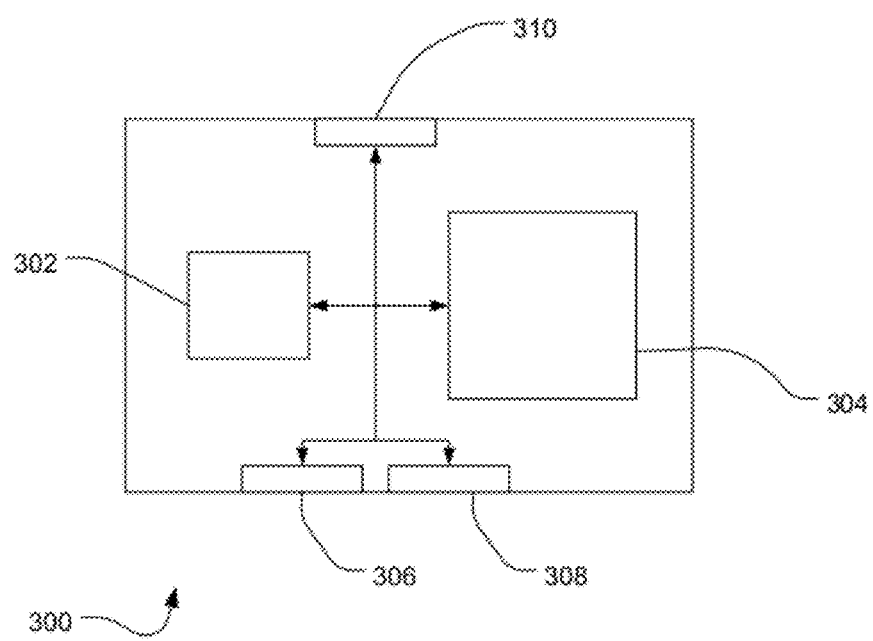
FIG. 3 is a block diagram of a stress testing system according to an embodiment of the invention.

As mentioned above, in some cases the user interface 200 is generated by a computer processor that is programmed with software instructions for generating the interface 200 and conducting the stress testing. Referring to FIG. 3, a block diagram of a stress testing system 300 is shown according to an embodiment of the invention. In this embodiment the stress testing system 300 is generally driven by a computer processor 302, which executes machine-readable instructions to provide the user interface 200, as well as other functionality in certain embodiments of the invention. The processor 302 can be any suitable programmable processor that is capable of executing coded instructions. For example, the processor 302 may be a microprocessor, or a special-purpose processor designed specifically for the stress testing system 300.

In this example the system 300 includes the processor 302 electrically coupled to a computer-readable memory device 304. The memory device 304 includes machine-executable instructions that cause the processor 302 to provide the system 300 with the capability to generate stressed financial ratios, stressed risk ratings, and/or any other functionality described elsewhere herein. As used herein, a memory device generally comprises a form of tangible, physical medium that can be read and/or written to by the processor 302. In some cases the memory device 304 is referred to as "non-transitory" merely to indicate the physical form that the device takes, as opposed to a signal medium per se. The memory device 304 can include any type of tangible computer readable media such as internal or removable storage devices used within or in conjunction with a computer at run time and/or for longer term data retention, including volatile and/or non-volatile forms. As just a few non-limiting examples, a computer readable memory device can be any one of a number of components normally included in a computer or separate products used with a computer. Such examples may include solid state memory, RAM, ROM, optical disks, hard disks, magnetic tapes and any other such components and/or products.

The system 300 also includes an input port 306 for connecting an input device, which may be provided in any suitable form. For example, the input device can include a keypad, keyboard, pointing device, touch screen, etc., connected to the processor 302 in order to forward inputs to the processor. The system 300 also includes an output port 308, for connecting an output device such as an electronic display, in communication with the processor 302 for receiving and displaying electrical signals representative of data to be displayed to a system user. The system 300 also includes a communications port 310 for connecting the system 300 to a communications network, such as a local area network, another dedicated network, or the Internet. The system 300 may include a wide variety of other components not shown in FIG. 3, such as components or modules customarily found in a computer. Communication between modules may be provided in any suitable form, such as wired and/or wireless.

In certain embodiments, components of the stress testing system 300 may be incorporated into a single device, such as a computing device like a desktop or laptop computer. However, other types of computers (e.g., processor-based devices such as tablet computers, personal digital assistants, mobile telephones, smart phones, digital media players, etc.) may also be employed depending upon the available processing power, memory capacity, etc. In some cases a discrete memory device (e.g., CD ROM, DVD ROM, flash drive, removable magnetic storage disk, etc.) apart from any specific system may include instructions for implementing certain functionality, such as methods of stress testing described elsewhere herein. In one embodiment a computer-readable memory device includes stored, executable instructions for causing one or more processors to receive a selection of a selected account type and a stress amount for applying to the selected account type, receive an input from a database, and generate a stressed financial ratio for a borrower as a function of an unstressed financial ratio for the borrower, the stress amount, a numerator factor corresponding to the selected account type, and a denominator factor corresponding to the selected account type.

Figure 4:
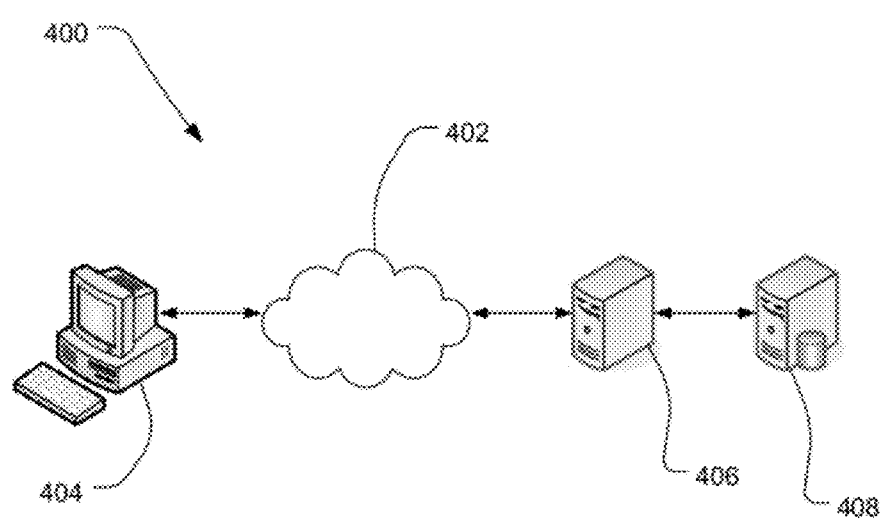
FIG. 4 is an illustration of a stress testing system according to an embodiment of the invention.

According to some embodiments of the invention, a stress testing system may include multiple processors and memory devices and/or may be distributed across a network or across multiple locations. For example, a remote server having one or more processors and memory devices may host a financial analysis software application that is accessible from one or more other devices, such as a PC or a smart phone. FIG. 4 is an illustration of one type of distributed stress testing system 400 according to an embodiment of the invention. The system 400 includes multiple computers in communication over a network 402. The network 402 may be any type of electronically connected group of computers including, for instance, one of the following networks: Internet, Intranet, Local Area Networks (LAN), Wide Area Networks (WAN) or an interconnected combination of these network types. In addition, the connectivity within the system 400 may be provided by any known wired and/or wireless communication protocol. Computers linked to the network 402 may be any type of known computing device (e.g., desktop, server, portable, hand-held, set-top box, personal digital assistant (PDA), a terminal) and may vary widely in processing power, internal memory, and other performance aspects.

As illustrated in FIG. 4, the stress testing system 400 includes a client 404, a web server 406, and an application/database server 408 connected to the network 402. The client machine may be any machine that is compatible with the network 402, such as a personal computer (PC), work station, dedicated terminal, personal data assistant (PDA), or other similar equipment. As will be appreciated, the term "client" generally refers to a client computer issuing commands to a server and does not at all limit the class of user that may be operating the client computer. Each server 406, 408 is typically a powerful computer or device that manages network resources and responds to client commands. As is known in the art, the servers include computer-readable data storage media such as hard disk drives and RAM that store program instructions and data. Using such stored programs, the web server 406 and application/database server 408 can run application programs that respond to client commands, including a web server application for responding to client requests for HTML pages and/or a financial analysis software application running on the application/database server 408.

Of course, the systems shown in FIGS. 3 and 4 are just two examples of possible system configurations for providing the functionality described herein. In describing various embodiments of the invention, many aspects of the embodiments are discussed herein in terms of functionality, in order to more particularly emphasize their implementation independence. Embodiments of the invention may be implemented using a combination of hardware, firmware, and/or software. For example, in many cases some or all of the functionality provided by embodiments may be implemented in executable software instructions capable of being carried on a programmable computer processor. Likewise, some embodiments of the invention include a computer-readable storage device on which such executable software instructions are stored. In certain embodiments, a system processor itself may contain instructions to perform one or more tasks, such as in cases where a field programmable gate array (FPGA) or application specific integrated circuit (ASIC) are used. System processing capabilities are not limited to any specific configuration and those skilled in the art will appreciate that the teachings provided herein may be implemented in a number of different manners.

Figure 5:
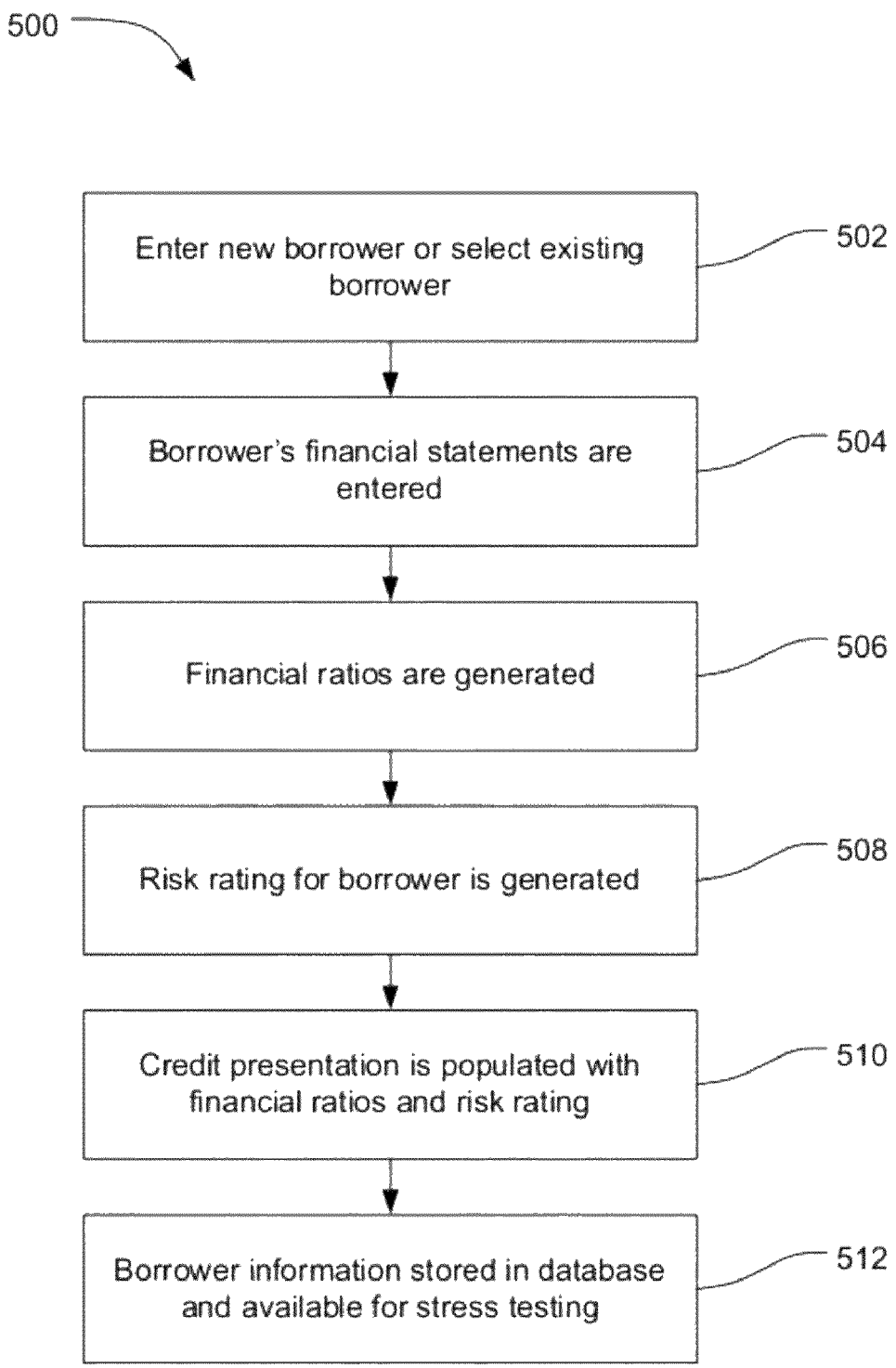
FIG. 5 is a flow diagram illustrating a method for collecting borrower financial information according to an embodiment of the invention.

FIG. 5 is a flow diagram illustrating a method 500 for collecting and generating borrower financial information according to an embodiment of the invention. As described with reference to FIG. 1, in some embodiments a stress testing system may reference and/or receive one or more inputs from an existing data warehouse that stores financial information related to one or more borrowers. The data warehouse, also referred to herein as a database, is stored in one or more computer-readable memory devices, such as a hard disk drive, solid state memory or another form of computer memory, and is housed within or in communication with, one or more computers. As just one example, the database may be accessible with an application server and/or database server program. In addition, the database/warehouse may include borrower financial information gathered for purposes of stress testing as described herein. The borrower information may additionally be used for other presentation and analysis purposes as will be recognized. In some cases the database of borrower financial information may be part of an existing financial analysis software application. One example of such a financial analysis software application is the on-demand lending software available from WebEquity Solutions, LLC, the owner of the instant application.

Returning to FIG. 5, the collection and generation of borrower financial information includes an initial step of entering 502 information identifying a new borrower or selecting an existing borrower. (While FIG. 5 is presented in terms of a single borrower, it should be appreciated that the same process can be used to collect and generate financial information for any number of borrowers.) After identifying the borrower, information from the borrower's financial statements is entered into the database. For example, account values and other amounts describing various aspects of the borrower's financial standing may be entered into the database. Just a few examples of these types of accounts include different revenues, expenses, sales, profits, assets, and liabilities. Such values may be taken from any relevant financial documents of the borrower, including for example, borrower balance sheets, income and/or expense reports, and/or loan collateral documents.

Initial, unstressed financial parameters can then be calculated from the borrower's financial information and also stored within the database. In this illustrated embodiment, one or several financial ratios are generated 506 and a risk rating is generated 508 for each borrower based on each borrower's financial information in the database. For example, many lenders have customized risk rating algorithms that they use to rate the riskiness or creditworthiness of borrowers based on combinations of various financial ratios and/or other financial measures. The risk rating algorithms may be customized specifically for different types of borrowers, industry segments, borrower size, etc. In some cases one or more financial ratios are generated 506, and then used to generate 508 a risk rating using an appropriate risk rating engine as determined by a specific lender for a specific customer/borrower (see, e.g., FIG. 1). In some cases a credit presentation for each borrower is optionally populated 510 with the borrower's financial information, including the computed financial ratios and risk rating, thus providing a snapshot of each borrower's financial position. At this point, the borrower's financial information (both raw and generated data) is stored in the database and available for stress testing 512.

Figure 6:
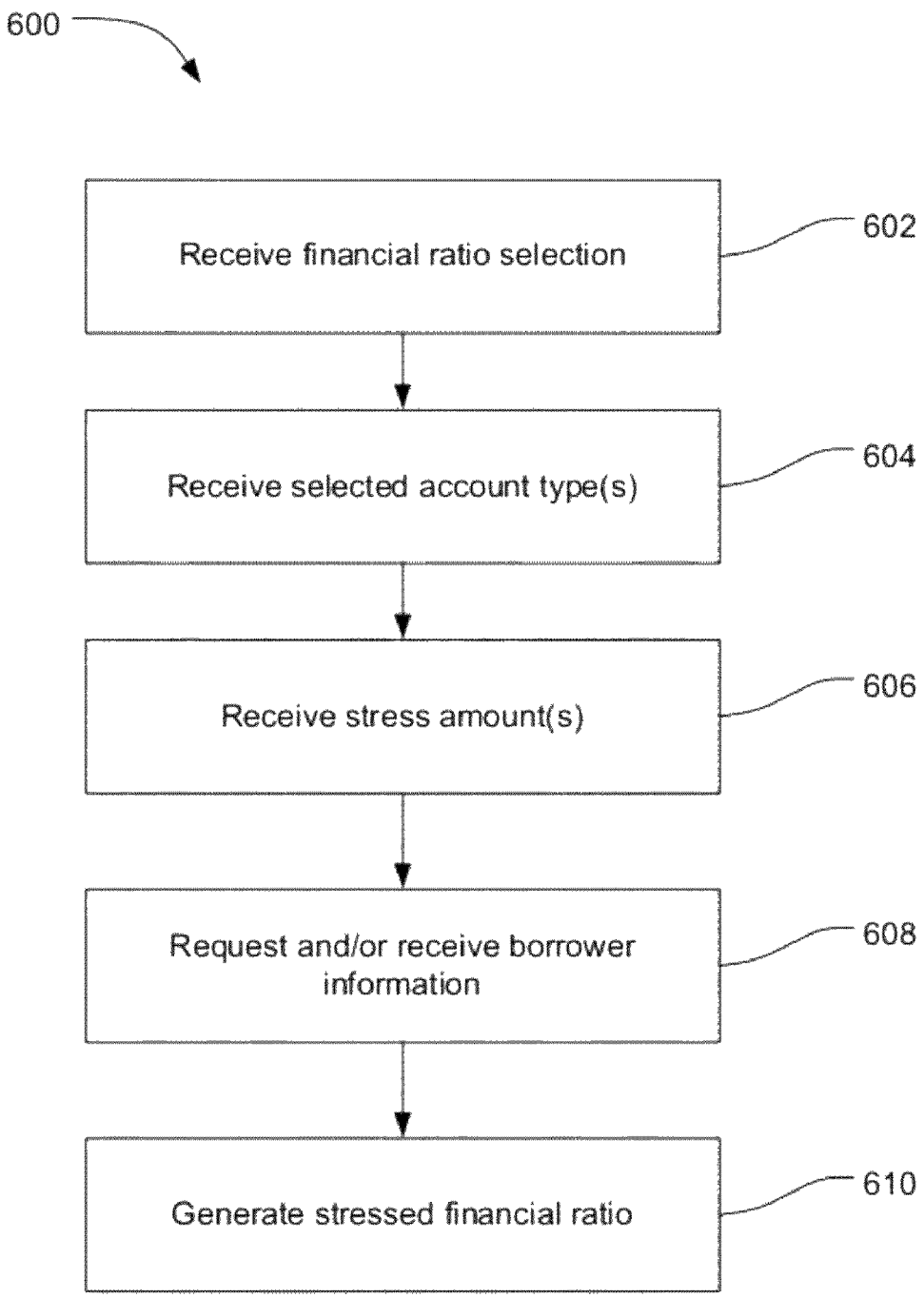
FIG. 6 is a flow diagram illustrating a method for generating a stressed financial ratio according to an embodiment of the invention.

FIG. 6 is a flow diagram illustrating a method 600 for generating a stressed financial ratio for a borrower according to an embodiment of the invention. The method 600 is a computerized method in that it can be carried out using one of the processor-based systems illustrated in FIGS. 3 and 4 or otherwise described herein, or any other computer processor-based device or system. Initial steps in the method 600 include receiving parameter selections and/or other inputs to be used in generation of the stressed financial ratio. A first step in some cases includes receiving a selection of the financial ratio to be stressed 602. However, in some cases this selection may already be made or the method may only provide stressing for a single financial ratio or predetermined number of financial ratios. In this illustrated example, the method 600 also includes receiving a selection of a selected account type 604 for a borrower, receiving a stress amount 606 for applying to the selected account type, and requesting and/or receiving an input 608 of financial related information for the borrower.

In some embodiments more than one account type may be selectable, allowing a user to simultaneously apply stresses to two or more accounts for a borrower. A unique stress amount selection may also be received for each account type selection. Borrower financial information can be requested and/or received from a database of borrower financial information, such as a database of borrower account information and derived information (e.g., unstressed financial ratios) as mentioned above. Alternatively, a user could enter any value requested from a database. The type and amount of information requested and/or received from the database may vary depending upon the number of selected account types and any other information entered by a user according to alternative embodiments. In some cases requesting and/or receiving borrower information 608 includes receiving an unstressed financial parameter corresponding to a borrower, along with one or more other numerical factors as will be described in more detail. For example, the method may include receiving a numerator factor and a denominator factor corresponding to each selected account type being stressed.

After receiving all of the desired selections, user-entered inputs, and/or inputs from a borrower database, the method 600 includes generating a stressed financial ratio 610 for a borrower with one or more processors based upon all of the selected/entered/received information. In certain embodiments the method 600 may be used to iteratively generate stressed financial ratios for multiple borrowers, thus allowing a system user to easily and simultaneously see the effects of a particular stress upon any number of borrowers.

According to one embodiment, the stressed financial ratio is generated 610 solely as a function of an unstressed financial ratio for the borrower and the following inputs for each selected account type: the stress amount, a numerator factor, and a denominator factor. Accordingly, in some cases the stressed financial ratio is generated based on the unstressed financial ratio and the additional inputs without the need to completely recalculate the ratio using all of its underlying fundamental factors/inputs. It will be appreciated that determining a particular financial ratio for a borrower can be a tedious and time-consuming computation, especially for a borrower with relatively complex financial circumstances, including complex balance sheets, income/expense reports, and/or loan collateral documents for one or more businesses or industries. According to one aspect of the invention, some embodiments employ a stress model that in a way isolates and determines the effect of certain variables (e.g., account values) being stressed without the need to separately analyze and account for unstressed variables (e.g., account values) also contributing to the overall determination of a particular financial ratio. Accordingly, some embodiments provide a method of more quickly generating stressed financial parameters, which can be useful for speeding calculations for a borrower with many accounts and/or a group of a large number of borrowers.

According to an embodiment of the invention, one of two stress models or relationships may be used to generate a stressed version of one or more financial ratios. In particular, a first relationship $$R(X) = r\frac{(1-XM)}{(1+XN)} \qquad (1)$$

can be used to generate stressed financial ratios for which a larger value indicates a more desirable (e.g., financially stronger) ratio value. A second relationship $$R(X) = r\frac{(1+XM)}{(1-XN)} \qquad (2)$$

can be used to generate stressed financial ratios for which a smaller value indicates a more desirable ratio value. For each of the first and second relationships, r is the unstressed financial ratio, M is a numerator factor, N is a denominator factor, X is the stress amount, and R(X) is the stressed financial ratio. Of course, it will be recognized that the first and second relationships can be considered different versions of the same relationship with the polarity of the stress amount X changed between versions.

According to some embodiments, the numerator factor and the denominator factor represent relationships between various types of accounts that have been predetermined for individual types of financial ratios. The factors are then computed for each account for each borrower being analyzed, making them available for use with the first and/or second stress testing relationships (1), (2). In some cases the numerator and denominator factors limit the effect of the stress amount multiplier X to the particular account being stressed or adjusted. Thus, by defining unique numerator and denominator factors for each type of borrower account, a single relationship (or at most two relationships) can be used to generate multiple stressed financial ratios without the need to recalculate each ratio from all of its constituent factors.

As will be appreciated, many financial ratios known in the art can be expressed as a ratio of a numerator and a denominator (referred to herein as a "financial ratio numerator" or "m" and a "financial ratio denominator" or "n"). The account values making up the financial ratio numerator and denominator vary with each ratio. As just one example, the financial ratio for term debt coverage includes a financial ratio numerator $m_{dc}$ represented by a borrower's repayment capacity, and a financial ratio denominator $n_{dc}$ represented by the sum of a borrower's term interest and term principal payments:

$$R_{dc} = m_{dc}/n_{dc} = \text{(Total Repayment Capacity)}/$$
$$\text{(Total Term Interest Payments + Total Principal Payments)}.$$

According to some embodiments, the numerator and denominator factors used to generate stressed financial ratios can be determined as a function of the financial ratio numerator and the financial ratio denominator, respectively, in conjunction with particular account values corresponding to the selected account type being stressed. For example, in some cases the numerator factor for a particular account type is a function of a numerator account value for that account type divided by the financial ratio numerator for the financial ratio being stressed:

$$M = A_m/m \qquad (3)$$

wherein m is the financial ratio numerator, and for a particular selected account type, M is the numerator factor and $A_m$ is the numerator account value. The numerator account value $A_m$ represents the influence or contribution of the value of the borrower account being stressed upon the particular financial ratio numerator m. In a similar manner, the denominator factor for a particular account type is determined as a function of a denominator account value for that account type divided by the financial ratio denominator for the financial ratio being stressed:

$$N = A_n/n \qquad (4)$$

wherein n is the financial ratio denominator, and for a particular selected account type, N is the denominator factor and $A_n$ is the denominator account value. The denominator account value $A_n$ represents the contribution or influence of the value of the borrower account being stressed upon the particular financial ratio denominator n.

Accordingly, numerator factors and denominator factors can be determined for multiple types of financial ratios using relationships (3) and (4), which can then be used to generate stressed financial ratios using one of the relationships (1) and (2) described above. In some cases the first and second stress relationships (1), (2), can be used to generate at least two different stressed financial ratios for a particular borrower. In certain embodiments, the first and second stress relationships (1), (2), can be used to generate at least fifteen different stressed financial ratios for a particular borrower. According to one embodiment, the first and second stress relationships (1), (2), can be used to generate any of up to seventeen different stressed financial ratios for a particular borrower. In this case the different financial ratios that can be stressed include term debt coverage ratio, current ratio, quick ratio, debt to tangible net worth ratio, debt to asset ratio, equity to asset ratio, loan to collateral ratio, collateral to loan ratio, gross profit margin ratio, operating income ratio, operating expense ratio, net profit margin ratio, working capital to gross revenues ratio, return on assets ratio, return on equity ratio, return on investment ratio, income sensitivity ratio, expense sensitivity ratio, and interest rate sensitivity ratio. These are merely examples of potential financial ratios and embodiments are not limited to any defined set of financial ratios. It should be appreciated that in some cases a fewer or a greater number of financial ratios may be generated and stressed.

Returning to the example of a term debt coverage ratio, a stressed term debt coverage ratio can be generated by simulating a decrease in, for example, a borrower's revenues or income as follows:

$$M = A_m/m = \text{(Gross Revenues)}/\text{(Total Repayment Capacity)},$$

$$N = A_n/n = (0)/\text{(Total Term Interest Payments +}$$
$$\text{Total Principal Payments)} = 0,$$

and $$R(X) = r\frac{(1-XM)}{(1+XN)} =$$

-continued $$r(1 - X((\text{Gross Revenues})/(\text{Total Repayment Capacity}))),$$

wherein X is the stress amount decrease in the borrower's revenues, r is the original, unstressed term debt coverage ratio, and R(X) is the generated stressed term debt coverage ratio. Simulating a different stress, such as an increase in operating expenses or an increase in interest expenses would follow the same general method with the use of numerator and denominator factors specific to those particular accounts being stressed.

In some embodiments the numerator factor M and/or the denominator factor N may be pre-calculated and stored in a data warehouse before stress testing occurs (e.g., upon entry of the account values and other financial information for a borrower). In some embodiments the numerator factor M and/or the denominator factor N may be calculated for individual accounts as needed during the stress testing process. For example, numerator account values, denominator account values, and numerator factors and denominator factors may be predefined relationships. Upon receiving instructions to generate a stressed financial ratio for a particular account type, a processor may retrieve relevant account values indexed within a database to calculate the corresponding numerator and/or denominator account values and factors. This can occur as a preliminary step to generating the stressed financial ratio as a function of the original financial ratio and stress amount.

Returning to FIG. 6, in some embodiments the method 600 for generating a stressed financial ratio includes receiving multiple selected account types 604 and corresponding stress amounts 606. In this case a user can simultaneously apply stresses to multiple borrower accounts (e.g., gross revenue, operating expense, interest expense, etc.) to determine how multiple changes in a borrower's financial position affect a particular financial ratio measure for the borrower. According to some embodiments the first and second stress relationships (1), (2) are modified to accommodate multiple account stresses as follows:

$$R(X) = r \frac{(1 - (X_a M_a + X_b M_b + X_c M_c + X_d M_d \ldots))}{(1 + (X_a N_a + X_b N_b + X_c N_c + X_d N_d \ldots))} \quad (5)$$

$$R(X) = r \frac{(1 + (X_a M_a + X_b M_b + X_c M_c + X_d M_d \ldots))}{(1 - (X_a N_a + X_b N_b + X_c N_c + X_d N_d \ldots))} \quad (6)$$

wherein $X_i$ is the stress factor for the ith selected account type, $M_i$ is the numerator factor for the ith selected account type, and $N_i$ is the denominator factor for the ith selected account type. According to some embodiments any number of unique selected account types can be simultaneously stressed. As just one example, one embodiment may allow for stressing up to four selected account types, although some stress test systems and methods may provide a lesser or a greater number of selected account types for simultaneous stressing.

Although not shown in FIG. 6, in certain embodiments the method 600 for generating a stressed financial ratio can be performed for any desirable number of borrowers. As discussed above, it is contemplated that a user may be able to select a wide variety of groupings of loans and/or borrowers for stress testing. As just a few examples, a user may be able to define a segment of a loan portfolio based on one or more of geography, industry, length of client relationship, account valuation, and the like. In addition, a user may simply select to stress the accounts of a single borrower or a specific set of borrowers by name. Accordingly, although not shown, in certain embodiments the method 600 may optionally include one or more steps for selecting a group of one or more borrowers for generating corresponding stressed financial ratios.

Figure 7:
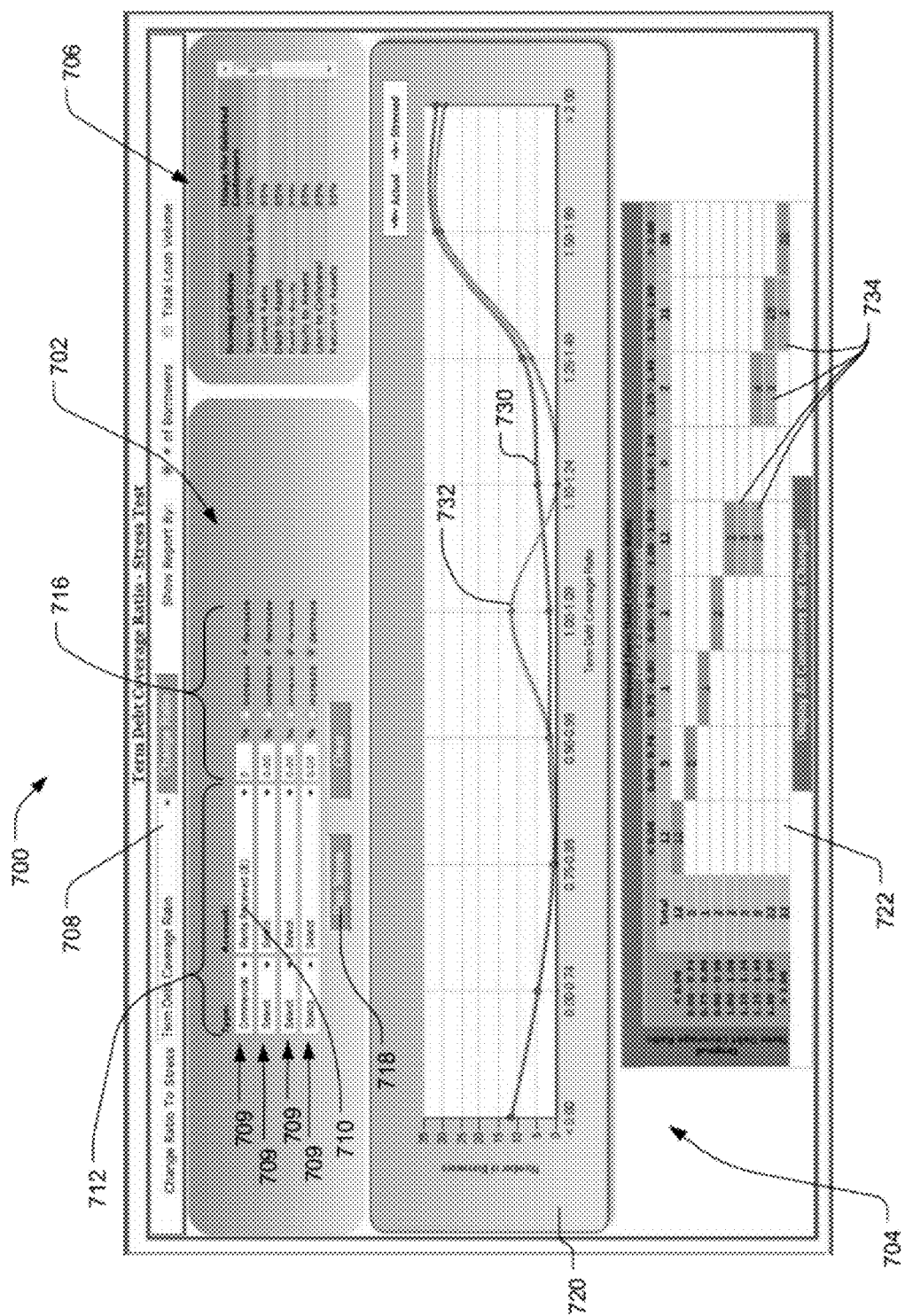
FIG. 7 is an illustration of a user interface for generating a stressed financial ratio according to an embodiment of the invention.

FIG. 7 is an example of a user interface 700 that can be generated by a processor-based system and used in conjunction with the method 600 for generating a stressed financial ratio according to an embodiment of the invention. The user interface 700 generally includes an input section 702, an output section 704, and an informational section 706. The input section 702 is adapted to allow a system user to select the desired financial ratio for stress testing and define at least some parameters for performing the stress test. In this case the input section 702 includes a drop down list 708 of different financial ratios than can be selected for stress testing. The list 708 of financial ratios can include any desirable financial ratio, including those listed above. As shown in FIG. 7, a term debt coverage ratio has been selected for stress testing in this example. The input section 702 also allows entry of up to four unique, simultaneous stresses 709 on different accounts of a borrower, although any number of unique stresses may be provided in other embodiments. A user selects the particular account 710 to stress using a series of drop down menus 712 that increasingly refine and zero in on the account selection. Of course different methodologies can be used for selecting a particular account. After selecting the particular account 710 to stress, a user can enter the stress amount 716, including a magnitude in terms of percentage and whether to apply the stress amount as an increase or decrease.

Clicking the "Run Stress" button 718 signals the system to generate a stressed term debt coverage ratio for all selected borrowers and display a corresponding output in the output section 704. In this example, the output section 704 includes a graph 720 and a migration table 722 that each display changes in the risk rating for a group of borrowers. The user interface 700 may allow for stress testing to be performed for any desirable number of borrowers as described elsewhere herein. Referring to the migration table 722 in FIG. 7, it can be seen that stress test results have been generated for a group of 100 borrowers in this example. After generating the stressed term debt coverage ratio for reach borrower, the system graphs both the original distribution 730 of ratios for the borrowers as well as the distribution 732 of stressed ratios to show the effects of the selected stresses upon the term debt coverage ratios of the group of borrowers. The migration table 722 shows another representation of the changed ratios 734 for the group of borrowers.

Figure 8A:
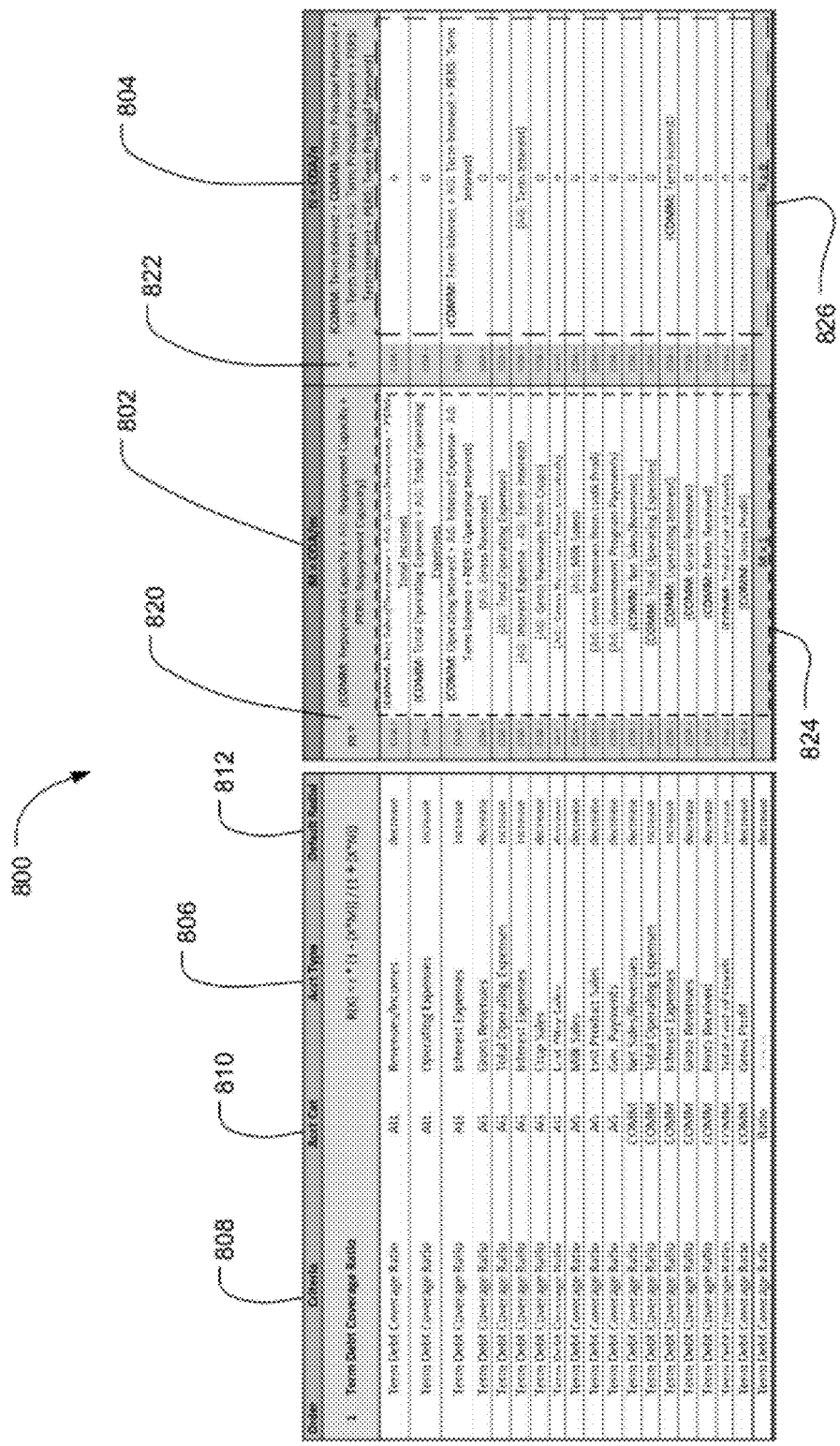
FIGS. 8A-8D are tabular representations of financial information corresponding to a borrower according to an embodiment of the invention.

FIG. 8A is a tabular representation 800 of stored financial information of a borrower according to an embodiment of the invention. The financial information can be stored in a database or data warehouse (see, e.g., FIGS. 1, 3, and 4 and corresponding discussion) stored in a computer readable memory device, which is in electrical communication with a processor programmed to request and receive financial information about the borrower. The memory can be any type of tangible computer readable media such as internal or removable storage devices used within or in conjunction with a computer at run time and/or for longer term data retention, including volatile and/or non-volatile forms. The financial information is shown in a tabular format 800 with rows and columns of data fields, although it is contemplated that any suitable format preserving the relationships between corresponding data entries could be utilized. Although not shown, it should be understood that the entries in FIG. 8A are textual descriptions for various fields of financial information and that a data entries for a particular borrower would include actual numerical values. The data table 800 also includes corresponding fields for the numerical values of each account type 806 in addition to the account type description. In some cases FIG. 8 can be considered to show a master form or template including field descriptions indicating the types of financial information generated and/or stored within a database for a particular borrower. It should be understood that a database may include financial information corresponding to the template for multiple borrowers.

For each individual borrower, a database stores financial information indicated in the table 800 that allows a stress testing system to retrieve or determine a numerator factor 802 and a denominator factor 804 for multiple different account types 806 listed in the table 800 for one or more financial ratios. The tabular representation 800 in FIG. 8A illustrates fields of financial information corresponding to a term debt coverage ratio according to one embodiment. In some cases account types 806 may be further divided by an account or loan category 810, thus making it possible to individually stress one of several categories of accounts. Of course, categories and account definitions may vary depending upon the nomenclature and categorization scheme used in particular circumstances. As just one example, in some cases financial information may be broken down into loan categories 810 of agricultural loans, commercial loans, and/or personal loans, depending upon the portfolio of a particular borrower. In this example, for each account type 806, the database also stores the default state 812 for the direction of the stress amount (e.g., decrease or increase). In some embodiments the stress relationship (e.g., relationships (1), (2) listed above) for a financial ratio may change if a user selects a direction for the stress amount opposite from the default state 812. For example, in one embodiment choosing the stress direction opposite from the default state 812 switches the sign of the stress amount X from positive to negative or from negative to positive.

In this example, the table 800 also illustrates fields for the financial ratio numerator 820 and the financial ratio denominator 822 for each financial ratio. FIG. 8A illustrates, for example, that in some cases the financial ratio numerator 820 for a term debt coverage ratio is $m$=(Commercial Repayment Capacity+Agricultural Repayment Capacity+Personal Repayment Capacity), and that the financial ratio denominator 822 is $n$=(Commercial Term Interest+Commercial Principal Payments+Agricultural Term Interest+Agricultural Principal Payments+Personal Term Interest+Personal Principal Payments).

Figure 8B:
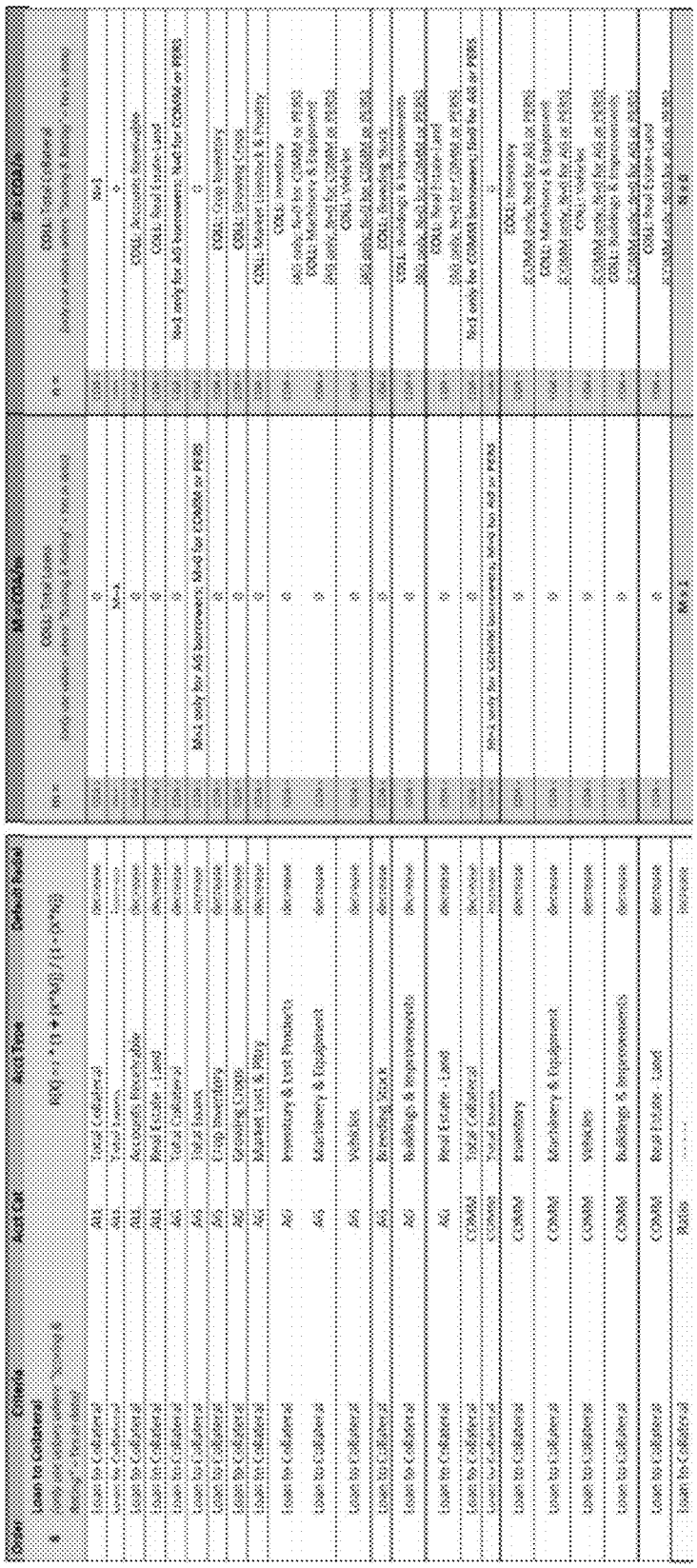
Figure 8C:
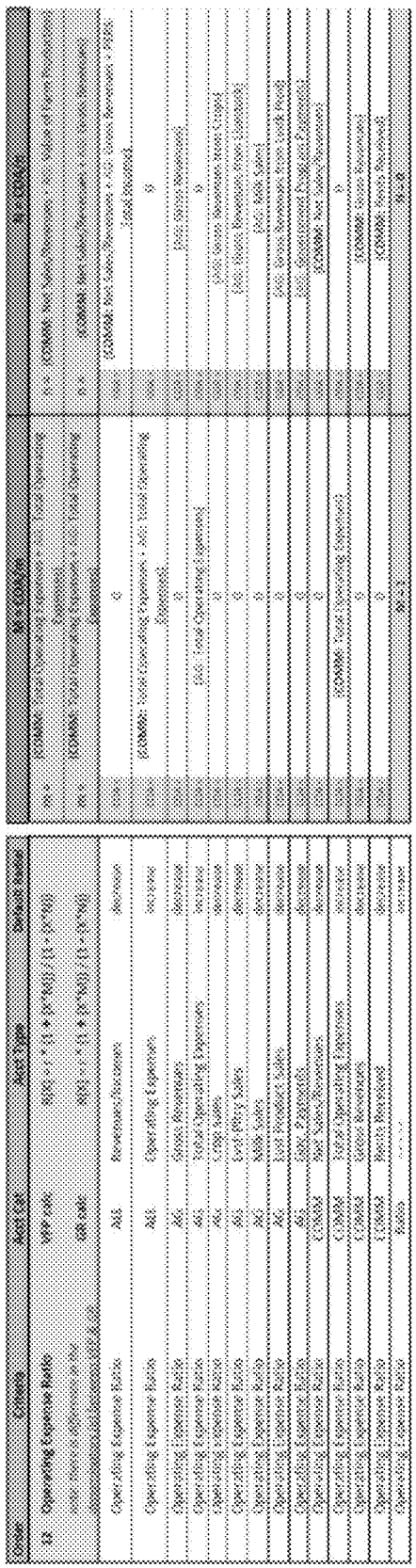
Figure 8D:
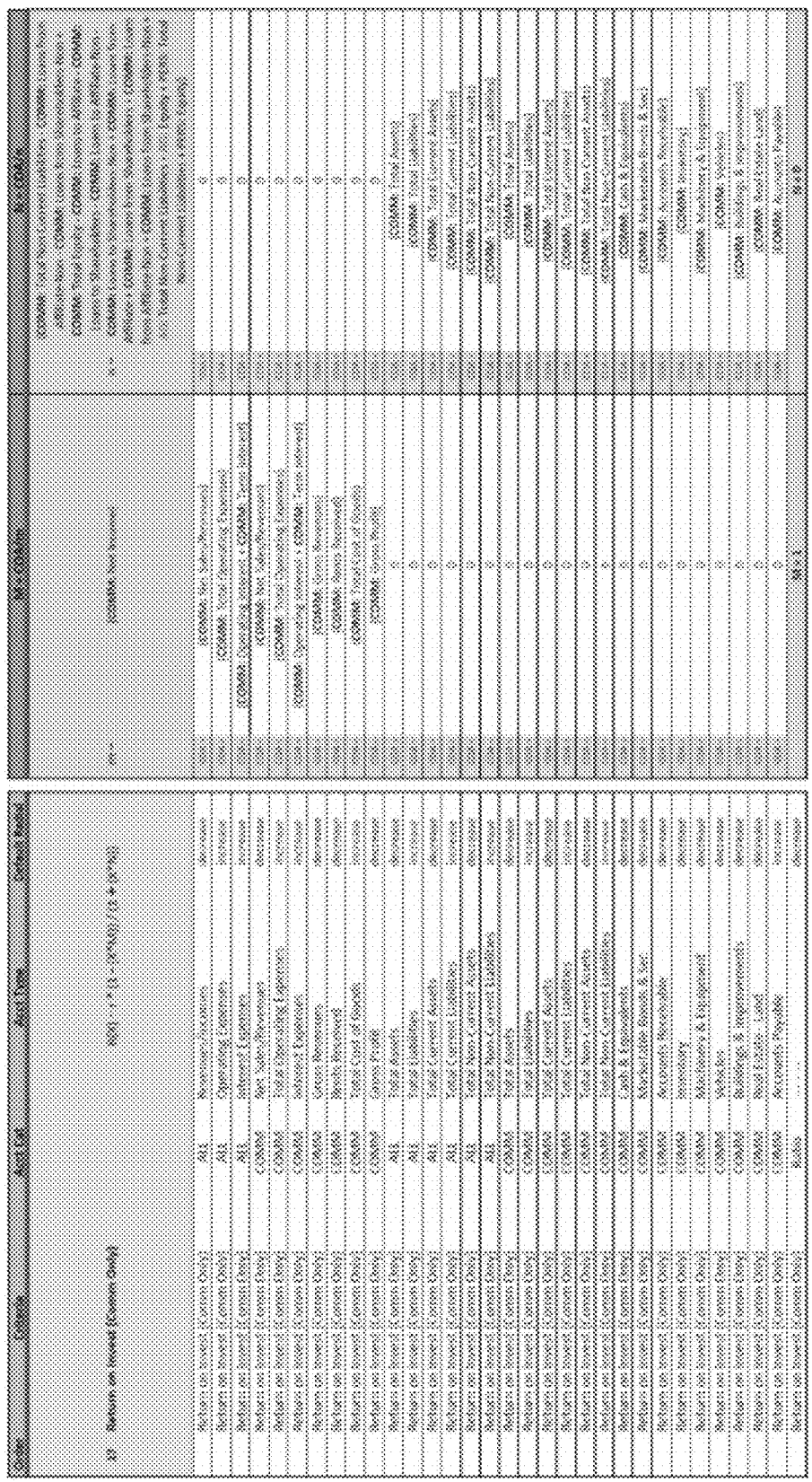

Although not shown in FIG. 8A, it is contemplated that the stored financial information may also store an unstressed financial ratio for each ratio category, which can then be used with the stress relationships (1), (2) to generate stressed financial ratios. In addition, the data table 800 also illustrates definitions (corresponding to numerical values stored in a database) for numerator account values 824 and denominator account values 826 for each account type 806 for the term debt coverage ratio. As mentioned above, the definitions of the numerator/denominator account values (and numerator/denominator factors) vary depending upon the particular financial ratio and account type being stressed. In particular, the definition of a particular numerator account value or denominator account value is specifically related to the contribution of a corresponding account type value to the numerator or denominator, respectively, of the overall financial ratio. The partial illustration of the table 800 in FIG. 8A provides a sample of the numerator and denominator account value definitions used for stress testing with a term debt coverage ratio. Of course it is contemplated that a database may include financial information related to any number of financial ratios depending upon the particular embodiment. FIGS. 8B, 8C, and 8D include examples of data tables 850, 860, and 870, respectively, illustrating definitions for financial information (including numerator and denominator account value definitions) stored for financial ratios including, respectively, loan to collateral, operating expense, and return on investment.

Figure 9:
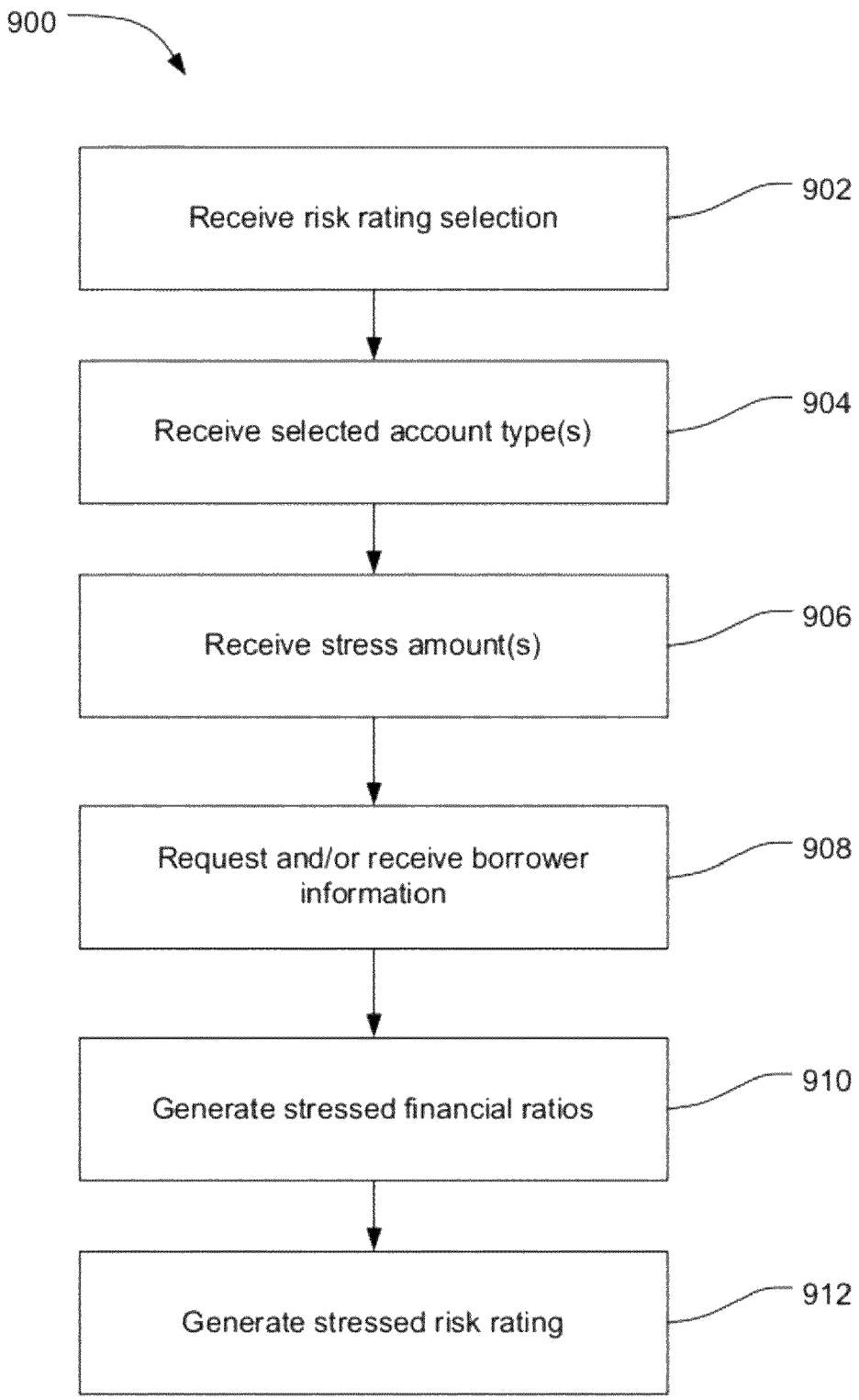
FIG. 9 is a flow diagram illustrating a method for generating a stressed risk rating according to an embodiment of the invention.

According to some embodiments of the invention, a stress testing system and/or method may also or alternatively provide for generating a stressed risk rating for one or more borrowers. FIG. 9 is a flow diagram illustrating a method 900 for generating a stressed risk rating according to an embodiment of the invention. In this example, the method 900 includes several steps to generate stressed financial ratios, which in turn can be used to generate a stressed risk rating. For example, many lenders have customized risk rating algorithms that they use to rate the riskiness or creditworthiness of borrowers based on combinations of various financial ratios and/or other financial measures. The risk rating algorithms may be customized specifically for different types of borrowers, industry segments, borrower size, etc. Referring back to FIG. 1, in some embodiments one or more stressed financial ratios are generated 108, and then used to generate 114 a stressed risk rating using an appropriate risk rating engine 116 as determined by a specific lender for a specific customer/borrower. Accordingly, stress testing systems and methods in certain embodiments can utilize lender-specific risk rating methodologies, thereby tailoring the stressed risk rating for a particular lender's customized lending practices.

Turning back to FIG. 9, the method 900 for generating a stressed risk rating includes an initial step of receiving a risk rating selection 902 (as opposed to, e.g., a financial ratio selection 602 in FIG. 6). However, in some cases this selection may already be made or the method may only provide stressing for risk rating. In this illustrated example, the method 900 also includes receiving a selection of one or more selected account types 904 for a borrower, receiving corresponding stress amounts 906 for applying to the selected account types, and requesting and/or receiving an input 908 of financial related information for the borrower (e.g., account values, numerator/denominator factors, as described above). In some cases requesting and/or receiving borrower information 908 also includes receiving unstressed financial ratios and/or an unstressed risk rating corresponding to a borrower.

After receiving all of the desired selections, user-entered inputs, and/or information from a borrower database, the method 900 includes generating stressed financial ratios 910 for a borrower as described above with respect to FIG. 6. The method 900 also includes generating a stressed risk rating 912 using the stressed financial ratios previous generated. For example, the method may include sending one or more stressed financial ratios to a separate risk rating engine as shown in FIG. 1, which then returns a recalculated risk rating for a borrower based on the stressed inputs.

Figure 10:
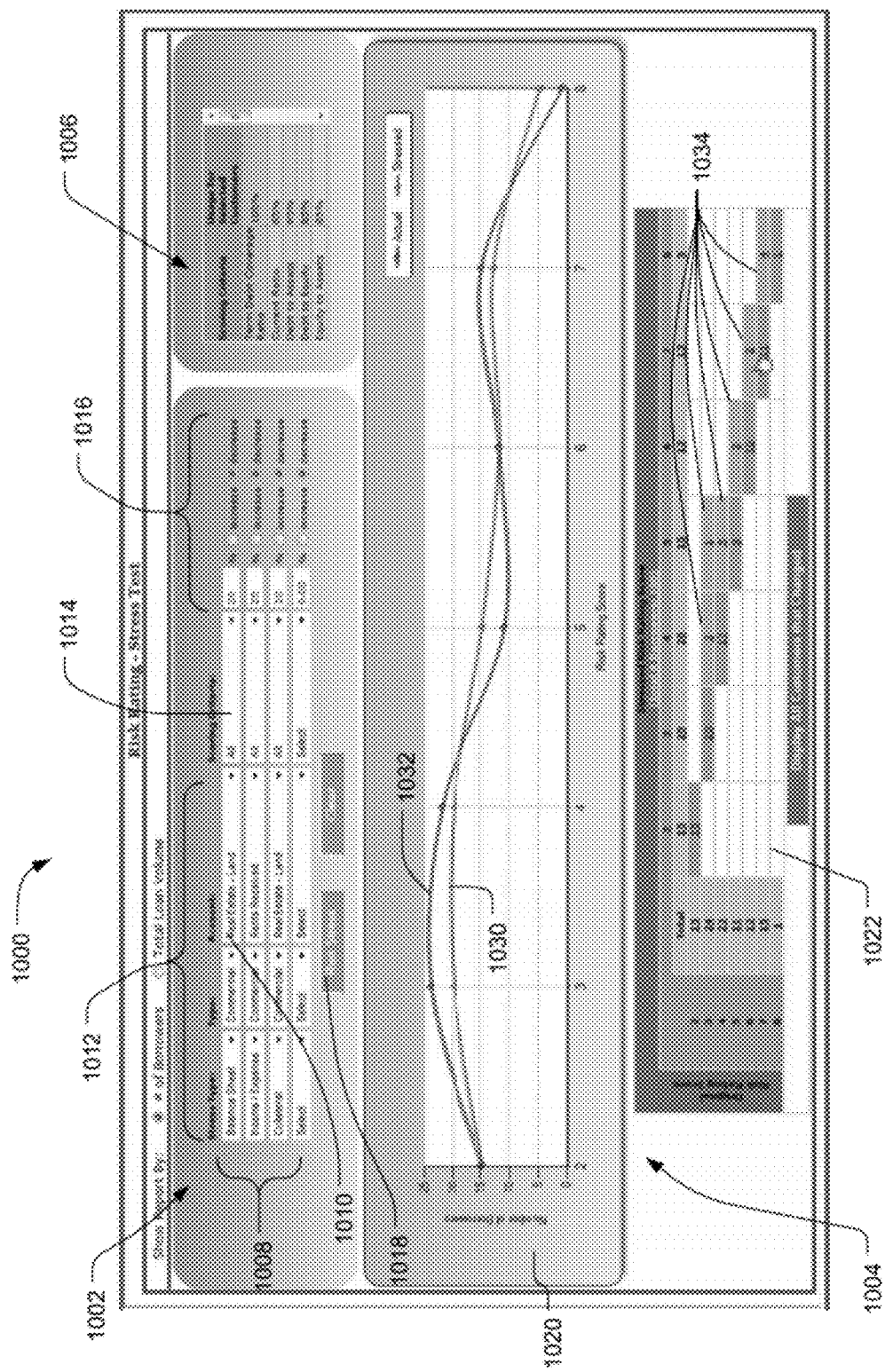
FIG. 10 is an illustration of a user interface for generating a stressed risk rating according to an embodiment of the invention.

FIG. 10 is an illustration of a user interface 1000 for generating a stressed risk rating according to an embodiment of the invention. According to some embodiments the user interface 1000 is a graphical user interface (GUI) that is programmed to be the front end or interactive portion of a stress testing engine programmed in software instructions for execution with a computer. The user interface 1000 in this example generally includes an input section 1002, an output section 1004, and an informational section 1006. In this case the input section 1002 allows entry of between one and four unique, simultaneous stresses 1008 on different accounts of a borrower. A user selects the particular account 1010 to stress using a series of drop down menus 1012 that increasingly refine the account selection. After selecting the particular account 1010 to stress, a user can select the scoring criteria 1014. The scoring criteria 1014 corresponds to the desired financial parameter (e.g., financial ratio or risk rating) chosen for stress testing. The informational section 1006 provides an indication of the different scoring criteria used throughout the group of selected borrowers. For stress testing a risk rating, a system user would typically select a scoring criteria of "all" scoring criteria, which would allow for stressing of all financial ratios that are used in the generation of a stressed risk rating. In certain embodiments, a user may select a single financial ratio for stressing and then observe changes in the stressed risk rating output to determine effects of particular parameters. Such a use can be helpful, for example, in more of a diagnostic setting to validate the risk rating model being used. Finally, the user enters the stress amount 1016, including a magnitude in terms of percentage and whether to apply the stress as an increase or decrease.

Clicking the "Run Stress" button 1018 signals the system to generate a stressed risk rating for one or more borrowers and display a corresponding output in the output section 1004. In this example, the output section 1004 includes a graph 1020 and a migration table 1022 that each display changes in the risk rating for the group of borrowers. After generating the stressed risk rating for reach borrower, the system graphs both the original distribution 1030 of risk ratings for the borrowers as well as the distribution 1032 of stressed risk ratings to show the effects of the selected stresses upon the risk ratings of the borrowers. The migration table 1022 shows another representation of the changed ratios 1034 for the group of borrowers.

The user interface 1000 may allow for generation of a stressed risk rating for any desirable number of borrowers. For example, additional interfaces (not shown) can be provided to allow a user to select a wide variety of groupings of loans and/or borrowers for stress testing. For example, a user may select a particular segment of a loan portfolio using one or more types of selection criteria as a precursor to the stress testing. Selection of a particular segment of borrowers can occur in any suitable manner and provide any desired degree of granularity. Referring to the migration table 1022 in FIG. 10, it can be seen that stressed risk ratings have been generated for a group of 100 borrowers in this example.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A computerized method for borrower stress testing, comprising:
   receiving by one or more processors a selection of an account type so as to establish a selected account type;
   receiving by one or more processors a stress amount for applying to the selected account type;
   receiving by one or more processors an input regarding financial information of a borrower from a database in a computer-readable memory device, the database comprising information related to a plurality of account types of the borrower; and
   generating by one or more processors a stressed financial ratio for the borrower as a function of an unstressed financial ratio for the borrower, the stress amount, a numerator factor corresponding to the selected account type, and a denominator factor corresponding to the selected account type, wherein
      the unstressed financial ratio is a function of a financial ratio numerator and a financial ratio denominator,
      the numerator factor is a function of the financial ratio numerator and a numerator account value for the selected account type, and
      the denominator factor is a function of the financial ratio denominator and a denominator account value for the selected account type.

2. The computerized method of claim 1, further comprising generating by one or more processors a stressed risk rating for the borrower as a function of the stressed financial ratio.

3. The computerized method of claim 1, wherein generating the stressed financial ratio comprises generating by one or more processors the stressed financial ratio according to one of a first relationship being $$R(X) = r\frac{(1 - XM)}{(1 + XN)},$$

and a second relationship being $$R(X) = r\frac{(1 + XM)}{(1 - XN)},$$

wherein r is the unstressed financial ratio, M is the numerator factor, N is the denominator factor, X is the stress amount, and R(X) is the stressed financial ratio.

4. The computerized method of claim 3, wherein $M=A_m/m$ and $N=A_n/n$, and wherein $A_m$ is the numerator account value for the selected account type, m is the financial ratio numerator, $A_n$ is the denominator account value for the selected account type, and n is the financial ratio denominator.

5. The computerized method of claim 3, wherein generating the stressed financial ratio comprises generating the stressed financial ratio so that a larger value indicates a more desirable ratio value when the first relationship is used and a smaller value indicates a more desirable ratio value when the second relationship is used.

6. The computerized method of claim 3, wherein generating the stressed financial ratio comprises generating by one or more processors at least two different stressed financial ratios for the borrower using, for each of the at least two different stressed financial ratios, the first and/or the second relationship and a corresponding unstressed ratio, a corresponding stress amount, a corresponding numerator factor, and a corresponding denominator.

7. The computerized method of claim 3, wherein generating the stressed financial ratio comprises generating by one or more processors at least fifteen different stressed financial ratios for the borrower using, for each of the at least fifteen different stressed financial ratios, the first and/or the second relationship and a corresponding unstressed ratio, a corresponding stress amount, a corresponding numerator factor, and a corresponding denominator factor.

8. The computerized method of claim 1, wherein the database comprises information related to a plurality of borrowers, and further comprising receiving a selection of a subset of the plurality of borrowers and generating by one or more processors the stressed financial ratio for each borrower within the subset of the plurality of borrowers.

9. The computerized method of claim 8, further comprising generating by one or more processors a migration table showing changes between unstressed financial ratios and the stressed financial ratios for the subset of the plurality of borrowers.

10. The computerized method of claim 1, further comprising receiving a selection of a financial ratio for generating the stressed financial ratio.

11. The computerized method of claim 1, further comprising receiving a selection of a risk rating and generating by one or more processors a stressed risk rating for the borrower as a function of the stressed financial ratio.

12. The computerized method of claim 1, further comprising receiving a selection of an additional account type so as to establish a selected additional account type;
receiving a stress amount for applying to the selected additional account type; and
generating by one or more processors the stressed financial ratio for the borrower additionally as a function of the selected additional account type, the stress amount for the selected additional account type, a numerator factor corresponding to the selected additional account type, and a denominator factor corresponding to the selected additional account type, wherein
the numerator factor corresponding to the selected additional account type is a function of the financial ratio numerator and a numerator account value for the selected additional account type, and
the denominator factor corresponding to the selected additional account type is a function of the financial ratio denominator and a denominator account value for the selected additional account type.

13. The computerized method of claim 1, wherein the unstressed financial ratio is selected from the group of financial ratios consisting of term debt coverage ratio, current ratio, quick ratio, debt to tangible net worth ratio, debt to asset ratio, equity to asset ratio, loan to collateral ratio, collateral to loan ratio, gross profit margin ratio, operating income ratio, operating expense ratio, net profit margin ratio, working capital to gross revenues ratio, return on assets ratio, return on equity ratio, return on investment ratio, income sensitivity ratio, expense sensitivity ratio, and interest rate sensitivity ratio.

14. A computer-readable memory device comprising executable instructions for causing one or more processors to:
receive a selection of an account type so as to establish a selected account type;
receive a stress amount for applying to the selected account type;
receive an input from a database regarding financial information of a borrower, the database comprising information related to a plurality of account types of the borrower; and
generate a stressed financial ratio for the borrower as a function of an unstressed financial ratio for the borrower, the stress amount, a numerator factor corresponding to the selected account type, and a denominator factor corresponding to the selected account type, wherein
the unstressed financial ratio is a function of a financial ratio numerator and a financial ratio denominator,
the numerator factor is a function of the financial ratio numerator and a numerator account value for the selected account type, and
the denominator factor is a function of the financial ratio denominator and a denominator account value for the selected account type.

15. A system for borrower stress testing, comprising:
one or more processors adapted for carrying out computer-executable instructions; and
one or more computer-readable memory devices coupled to the one or more processors, the one or more computer-readable memory devices comprising executable instructions for causing the one or more processors to
receive a selection of an account type so as to establish a selected account type,
receive a stress amount for applying to the selected account type,
receive an input from a database regarding financial information of a borrower, the database comprising information related to a plurality of account types of the borrower, and
generate a stressed financial ratio for the borrower as a function of an unstressed financial ratio for the borrower, the stress amount, a numerator factor corresponding to the selected account type, and a denominator factor corresponding to the selected account type, wherein
the unstressed financial ratio is a function of a financial ratio numerator and a financial ratio denominator,
the numerator factor is a function of the financial ratio numerator and a numerator account value for the selected account type, and
the denominator factor is a function of the financial ratio denominator and a denominator account value for the selected account type.

16. The system of claim 15, wherein the executable instructions for causing the one or more processors to generate the stressed financial ratio comprise executable instructions for causing the one or more processors to generate the stressed financial ratio according to one of a first relationship being $$R(X) = r\frac{(1-XM)}{(1+XN)},$$

and a second relationship being $$R(X) = r\frac{(1+XM)}{(1-XN)},$$

wherein r is the unstressed financial ratio, M is the numerator factor, N is the denominator factor, X is the stress amount, and R(X) is the stressed financial ratio.

17. The system of claim 16, wherein $M=A_m/m$ and $N=A_n/n$, and wherein $A_m$ is the numerator account value for the selected account type, m is the financial ratio numerator, $A_n$ is the denominator account value for the selected account type, and n is the financial ratio denominator.

18. The system of claim 16, wherein the executable instructions for causing the one or more processors to generate the stressed financial ratio comprise executable instructions for causing the one or more processors to generate at least two different stressed financial ratios for the borrower using, for each of the at least two different stressed financial ratios, the first and/or the second relationship and a corresponding unstressed ratio, a corresponding stress amount, a corresponding numerator factor, and a corresponding denominator factor.

19. The system of claim 15, wherein the database comprises information related to a plurality of borrowers, and wherein the executable instructions further comprise executable instructions for causing the one or more processors to receive a selection of a subset of the plurality of borrowers and generate the stressed financial ratio for each borrower within the subset of the plurality of borrowers.

20. The system of claim 15, wherein the executable instructions further comprise executable instructions for causing the one or more processors to receive a selection of a financial ratio for generating the stressed financial ratio.

21. The system of claim 15, wherein the executable instructions further comprise executable instructions for causing the one or more processors to generate a stressed risk rating for the borrower as a function of the stressed financial ratio.

22. The system of claim 15, wherein the executable instructions further comprise executable instructions for causing the one or more processors to
receive a selection of an additional account type so as to establish a selected additional account type;
receive a stress amount for applying to the selected additional account type; and
generate the stressed financial ratio for the borrower additionally as a function of the selected additional account type, the stress amount for the selected additional account type, a numerator factor corresponding to the selected additional account type, and a denominator factor corresponding to the selected additional account type, wherein
the numerator factor corresponding to the selected additional account type is a function of the financial ratio numerator and a numerator account value for the selected additional account type, and
the denominator factor corresponding to the selected additional account type is a function of the financial ratio denominator and a denominator account value for the selected additional account type.

23. The system of claim 15, wherein the unstressed financial ratio is selected from the group of financial ratios consisting of term debt coverage ratio, current ratio, quick ratio, debt to tangible net worth ratio, debt to asset ratio, equity to asset ratio, loan to collateral ratio, collateral to loan ratio, gross profit margin ratio, operating income ratio, operating expense ratio, net profit margin ratio, working capital to gross revenues ratio, return on assets ratio, return on equity ratio, return on investment ratio, income sensitivity ratio, expense sensitivity ratio, and interest rate sensitivity ratio.

* * * * *